US009557493B2

(12) United States Patent
Wu et al.

(10) Patent No.: US 9,557,493 B2
(45) Date of Patent: Jan. 31, 2017

(54) OPTICAL FIBER JOINT, OPTICAL FIBER ADAPTER AND OPTICAL FIBER CONNECTOR

(71) Applicant: Huawei Technologies Co., Ltd., Shenzhen (CN)

(72) Inventors: Wenxin Wu, Shenzhen (CN); Xuesong Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 14/191,174

(22) Filed: Feb. 26, 2014

(65) Prior Publication Data

US 2015/0260926 A1 Sep. 17, 2015

Related U.S. Application Data

(63) Continuation of application No. PCT/CN2013/086983, filed on Nov. 12, 2013.

(51) Int. Cl.
*G02B 6/38* (2006.01)

(52) U.S. Cl.
CPC ........... *G02B 6/3869* (2013.01); *G02B 6/3825* (2013.01); *G02B 6/3831* (2013.01); *G02B 6/3891* (2013.01); *G02B 6/3816* (2013.01); *G02B 6/3849* (2013.01)

(58) Field of Classification Search
CPC ............................ G02B 6/3825; G02B 6/3869
See application file for complete search history.

(56) References Cited

U.S. PATENT DOCUMENTS

| 5,067,783 | A | 11/1991 | Lampert |
| 5,129,023 | A | 7/1992 | Anderson et al. |
| 5,297,227 | A * | 3/1994 | Brown ................. G02B 6/3825 385/138 |
| 6,371,657 | B1 | 4/2002 | Chen et al. |
| 6,609,833 | B1 | 8/2003 | Miyachi et al. |
| 6,899,467 | B2 | 5/2005 | McDonald et al. |
| 7,467,896 | B2 | 12/2008 | Melton et al. |
| 7,708,469 | B2 | 5/2010 | Liu et al. |
| 2004/0157499 | A1 | 8/2004 | Nania et al. |

(Continued)

FOREIGN PATENT DOCUMENTS

| CN | 101006376 | 7/2007 |
| CN | 201788298 U | 4/2011 |

(Continued)

*Primary Examiner* — Sung Pak
*Assistant Examiner* — Hoang Tran
(74) *Attorney, Agent, or Firm* — Slater Matsil, LLP

(57) ABSTRACT

An optical fiber joint includes: an optical fiber extending out of the optical cable is held in the cavity, one end of the inner sleeve element is fixed at the optical cable, and a sleeve is placed at the other end; and an outer sleeve element, the outer sleeve element is sleeved onto an outer side of the inner sleeve element; the sleeve of the inner sleeve element at least partially protrudes out of the outer sleeve element, a tail end of the sleeve protruding out of the outer sleeve element has an opening, so that the tail end of the sleeve forms a C-shaped section. Based on the foregoing technical solutions, the optical fiber connector according to the embodiments of the present disclosure is seamlessly connected to a C-shaped slot of an optical fiber adapter by using the sleeve having the C-shaped opening of the optical fiber joint.

9 Claims, 6 Drawing Sheets

(56) References Cited

U.S. PATENT DOCUMENTS

| | | | |
|---|---|---|---|
| 2005/0254757 A1* | 11/2005 | Ferretti, III | G02B 6/4471 |
| | | | 385/88 |
| 2006/0045428 A1 | 3/2006 | Theuerkorn et al. | |
| 2006/0193562 A1 | 8/2006 | Theuerkorn | |
| 2007/0172172 A1* | 7/2007 | Theuerkorn | G02B 6/3821 |
| | | | 385/53 |
| 2009/0305542 A1 | 12/2009 | Masuzaki | |
| 2012/0071019 A1 | 3/2012 | Takamatsu | |

FOREIGN PATENT DOCUMENTS

| | | |
|---|---|---|
| CN | 102870023 A | 1/2013 |
| EP | 0297439 B1 | 6/1988 |
| EP | 2717079 A1 | 4/2014 |
| JP | 2008089879 A | 4/2008 |
| JP | 2008102290 A | 5/2008 |

* cited by examiner

OPTICAL FIBER JOINT, OPTICAL FIBER ADAPTER AND OPTICAL FIBER CONNECTOR

This application is a continuation of International Application No. PCT/CN2013/086983, filed on Nov. 12, 2013, which is hereby incorporated by reference in their entireties.

TECHNICAL FIELD

The present disclosure relates to the field of data communications equipment, and in particular, to an optical fiber joint, an optical fiber adapter, and an optical fiber connector.

BACKGROUND

In an optical fiber communications system, an optical fiber connector is arranged for connection between optical cables, between an optical cable and an optic-to-electric component, and between optic-to-electric components. The optical fiber connector precisely interconnects end faces of two optical fibers that need to be connected, so that optical energy output by a transmit optical fiber can be maximally coupled to a receive optical fiber.

During layout of drop cables on a fiber to the home (Fiber To The Home, FTTH) network, a fusion splicing technique is generally used. That is, an optical fiber terminal is assigned in a fiber distribution box, the optical fiber terminal and a drop optical cable are spliced using an optical fiber fusion splicer in the fiber distribution box, and the drop optical cable is then laid to each home. At the other end of the drop optical cable, onsite fusion splicing is also required, so that the drop optical cable is connected to a user terminal box of each home. The foregoing fusion splicing technique requires dedicated optical fiber fusion splicing equipment, and imposes a high technical requirement on an operator. In addition, the operation process is tedious and inconvenient.

SUMMARY OF THE INVENTION

In view of this, embodiments of the present disclosure provide an optical fiber joint, an optical fiber adapter, and an optical fiber connector, which are plug and play and resolve a problem in the prior art that onsite fusion splicing is tedious.

According to a first aspect, an embodiment of the present disclosure provides an optical fiber joint (100), including: an optical cable (110); an inner sleeve element (140) with a cavity inside, where an optical fiber extending out of the optical cable (110) is held in the cavity, one end of the inner sleeve element (140) is fixed at the optical cable (110), and a sleeve (180) is placed at the other end; an outer sleeve element (130), where the outer sleeve element (140) is sleeved onto an outer side of the inner sleeve element (140), and the outer sleeve element (140) is capable of axially rotating around the sleeve (180); where the sleeve (180) of the inner sleeve element (140) at least partially protrudes out of the outer sleeve element (130), and a tail end of the sleeve (180) protruding out of the outer sleeve element (130) has an opening, so that the tail end of the sleeve (180) forms a C-shaped section.

In a first possible implementation manner of the first aspect, the C-shaped tail end of the sleeve (180) is configured to connect to a C-shaped slot (2012) of an optical fiber adapter (200) that matches the optical fiber joint (100).

In a second possible implementation manner of the first aspect, the opening of the sleeve (180) is configured to connect to a locating key (2014) of the optical fiber adapter (200) that matches the optical fiber joint (100).

In a third possible implementation manner of the first aspect, the sleeve (180) is configured to connect to a slot (2012) of the optical fiber adapter (200) that matches the optical fiber joint (100), where the C-shaped section at the tail end of the sleeve (180) matches a C-shaped section of the slot (2012) of the optical fiber adapter (200).

In a fourth possible implementation manner of the first aspect, the opening of the sleeve (180) is horn-shaped.

In a fifth possible implementation manner of the first aspect, an opening angle of the horn-shaped opening of the sleeve (180) is equal to or larger than 10 degrees, and is smaller than or equal to 30 degrees.

In a sixth possible implementation manner of the first aspect, the opening angle of the horn-shaped opening of the sleeve (180) is 15 degrees or 22.5 degrees.

According to a second aspect, an optical fiber adapter (200) is provided. A socket (201) is placed at one end of the optical fiber adapter (200), where a cavity (2011) configured to hold an optical fiber, and a slot (2012) are placed in the socket (201), where the cavity (2011) is located in a middle part of the socket (201); and the slot (2012) surrounds on a periphery of the cavity (2011), and a locating key (2014) is placed in the socket (201), so that the slot (2012) forms a C-shaped section.

In a first possible implementation manner of the second aspect, the slot (2012) having the C-shaped section is configured to hold a C-shaped tail end of a sleeve of an optical fiber joint (100) that matches the optical fiber adapter (200).

In a second possible implementation manner of the second aspect, the locating key (2014) is configured to connect to an opening of a sleeve of the optical fiber joint (100) that matches the optical fiber adapter (200).

In a third possible implementation manner of the second aspect, a width of the locating key (2014) is equivalent to a width of the opening of the optical fiber joint (100).

According to a third aspect, an optical fiber connector (10) is provided, including: an optical fiber joint (100) and an optical fiber adapter (200). The optical fiber joint (100) includes: an optical cable (110); an inner sleeve element (140) with a cavity inside, where an optical fiber extending out of the optical cable (110) is held in the cavity, one end of the inner sleeve element (140) is fixed at the optical cable (110), and a sleeve (180) is placed at the other end; and an outer sleeve element (130), where the outer sleeve element (130) is sleeved onto an outer side of the inner sleeve element (140), and the outer sleeve element (140) is capable of axially rotating around the sleeve; where the sleeve of the inner sleeve element (140) at least partially protrudes out of the outer sleeve element (130), and a tail end of the sleeve protruding out of the outer sleeve element (130) has an opening, so that the tail end of the sleeve forms a C-shaped section.

A socket (201) is placed at one end of the optical fiber adapter (200), where a cavity (2011) configured to house an optical fiber, and a slot (2012) are placed in the socket (201), where the cavity (2011) is located in a middle part of the socket (201); and the slot (2012) surrounds on a periphery of the cavity (2011), and a locating key (2014) is placed in the socket (201), so that the slot (2012) forms a C-shaped section.

In a first possible implementation manner of the third aspect, an inner wall of the outer sleeve element (130) of the optical fiber joint (100) has at least one projection (1304).

In a second possible implementation manner of the third aspect, at least one sliding slot (2015) is placed on an outer surface of the socket (201) of the optical fiber adapter (200).

In a third possible implementation manner of the third aspect, the optical fiber joint (100) is inserted into the optical fiber adapter (200), and the projection (1304) is connected to the sliding slot (2015).

Based on the foregoing technical solutions, the optical fiber connector provided by the embodiments of the present disclosure is seamlessly connected to the C-shaped slot of the optical fiber adapter by using the sleeve having the C-shaped opening of the optical fiber joint. In this way, blind insertion of the optical fiber joint is implemented, and the operation is simpler, thereby implementing plug and play of the optical fiber connector.

BRIEF DESCRIPTION OF THE DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

For ease of understanding, the following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
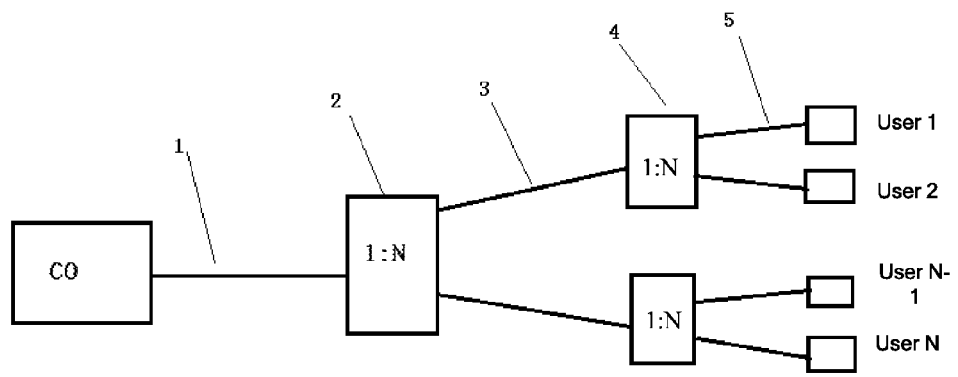
FIG. 1 is an architecture of an applied communications network according to an embodiment of the present disclosure.

FIG. 1 shows a part of an FTTx optical network, where FTTx may be FTTH (Fiber To The Home, fiber to the home), or FTTC (Fiber To The Curb, fiber to the curb), or FTTP (Fiber To The Premises, fiber to the premises), or FTTN (Fiber To The Node or Neighborhood, fiber to the node or neighborhood), or FTTO (Fiber To The Office, fiber to the office), or FTTSA (Fiber To The Service area, fiber to the service area). Using an FTTH network as an example, from the perspective of the downstream of a center office (Center Office, CO), FTTH includes a feed link 1, a first 1:N splitter 2, a distribution link 3, a second 1:N splitter 4, and at least one branch link 5. In the present disclosure, an optical fiber connector applicable to outdoor environment is applicable to the branch link 5. Although the present disclosure uses a network structure of a type of FTTx as an example, other network structures may also be used.

Figure 2A:
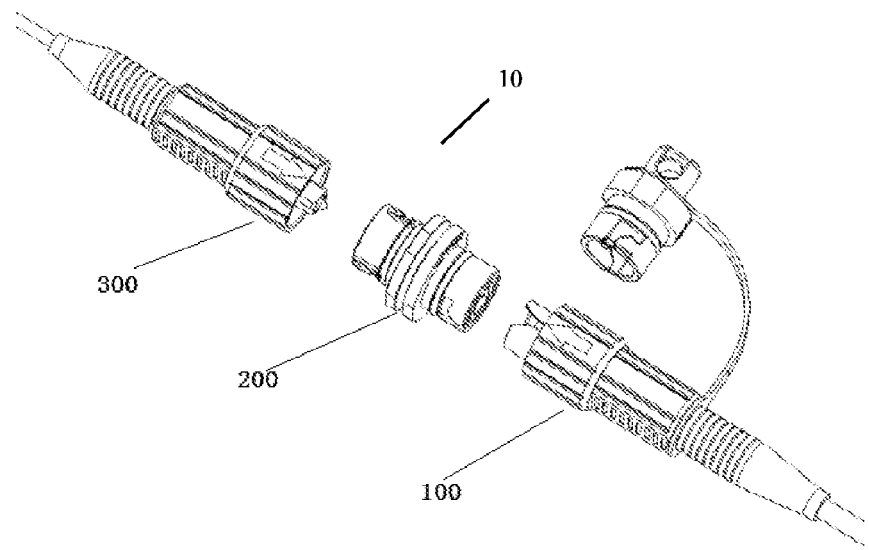
FIG. 2a is a schematic structural diagram of an optical fiber connector according to an embodiment of the present disclosure.

FIG. 2a shows an optical fiber connector 10 in the present disclosure. As shown in FIG. 2a, the optical fiber connector includes an optical fiber joint 100, an optical fiber joint 300, and an optical fiber adapter 200. The optical fiber joint 100 is connected to the optical fiber joint 300 by using the optical fiber adapter 200, implementing interconnection of internal optical fibers.

Figure 2B:
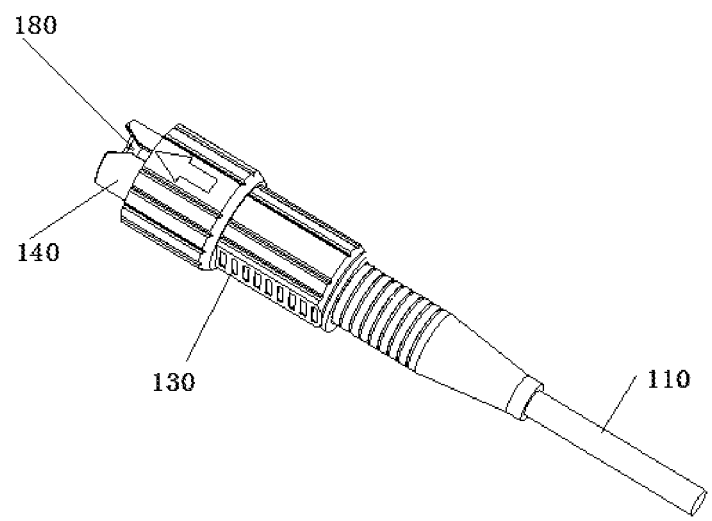
FIG. 2b is a schematic structural diagram of an optical fiber connector according to an embodiment of the present disclosure.

FIG. 2b is a schematic diagram of the optical fiber joint 100. As shown in FIG. 2b, from the perspective of an outer structure, the optical fiber joint 100 includes an optical fiber 110, an inner sleeve element 140, and an outer sleeve element 130. The inner sleeve element 140 has a cavity inside, where an optical fiber extending out of the optical cable 110 is held in the cavity, one end of the inner sleeve element 140 is fixed at the optical cable 110, and a sleeve 180 is placed at the other end. The outer sleeve element 130 is sleeved onto an outer side of the inner sleeve element 140, and the outer sleeve element 130 is capable of axially rotating around the sleeve 180. The sleeve 180 of the inner sleeve element 140 at least partially protrudes out of the outer sleeve element 130, and a tail end of the sleeve 180 protruding out of the outer sleeve element 130 has an opening, so that the tail end of the sleeve 180 forms a C-shaped section. The sleeve with the C-shaped opening may be seamlessly connected to a C-shaped slot of the optical fiber adapter. In this way, blind insertion of the optical fiber joint is implemented, and the operation is simpler, thereby implementing plug and play of the optical fiber connector.

The sleeve 180 may be a cylindrical sleeve, or an elliptical sleeve, or a sleeve in another shape. The embodiment of the present disclosure uses a cylindrical sleeve 180 as an example. From the perspective reverse to the axial direction of the sleeve 180, the C-shaped opening of the sleeve 180 is a circle or an ellipse with an opening.

Figure 5A:
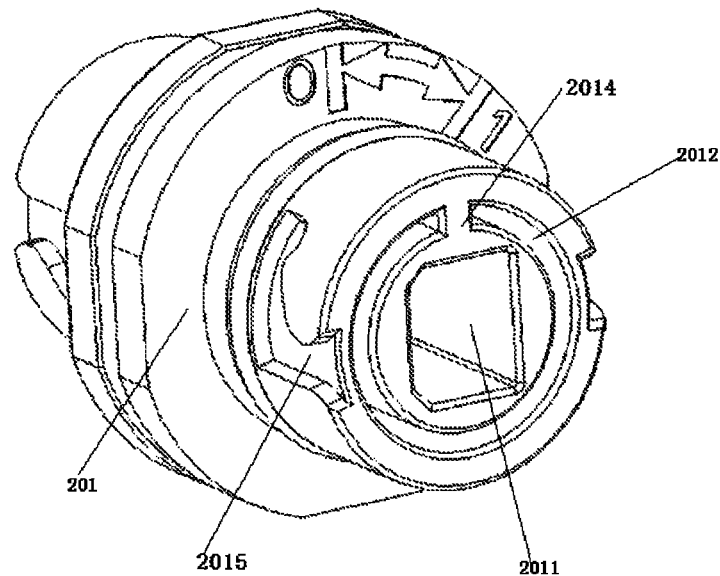
FIG. 5a is a schematic structural diagram of an optical fiber adapter according to an embodiment of the present disclosure.

Further, as shown in FIG. 5a, the C-shaped tail end of the sleeve 180 is configured to connect to a C-shaped slot 2012 of an optical fiber adapter 200 that matches the optical fiber joint 100. The opening of the sleeve 180 is configured to connect to a locating key 2014 of the optical fiber adapter 200 that matches the optical fiber joint 100. The sleeve is configured to connect to the slot 2012 of the optical fiber adapter 200 that matches the optical fiber joint 100, where the C-shaped section at the tail end of the sleeve matches a C-shaped section of the slot 2012 of the optical fiber adapter 200.

Figure 6:
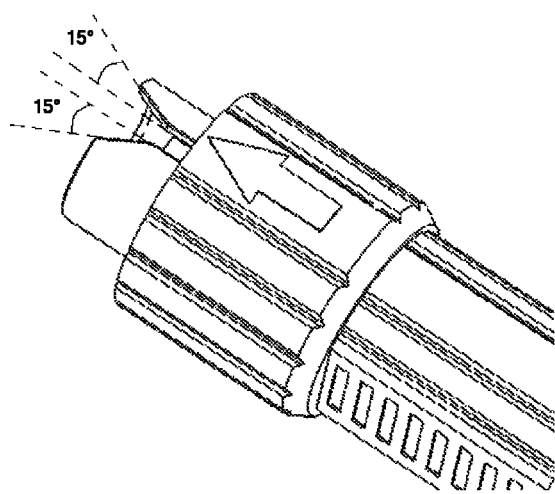
FIG. 6 is a schematic diagram of an angle of an opening of a sleeve of an optical fiber joint according to an embodiment of the present disclosure.

Further, the opening of the sleeve 180 is horn-shaped. An opening angle of the horn-shaped opening of the sleeve 180 is equal to or larger than 10 degrees, and is smaller than or equal to 30 degrees. The opening angle of the horn-shaped opening of the sleeve 180 is 15 degrees or 22.5 degrees as shown in FIG. 6.

Figure 3A:
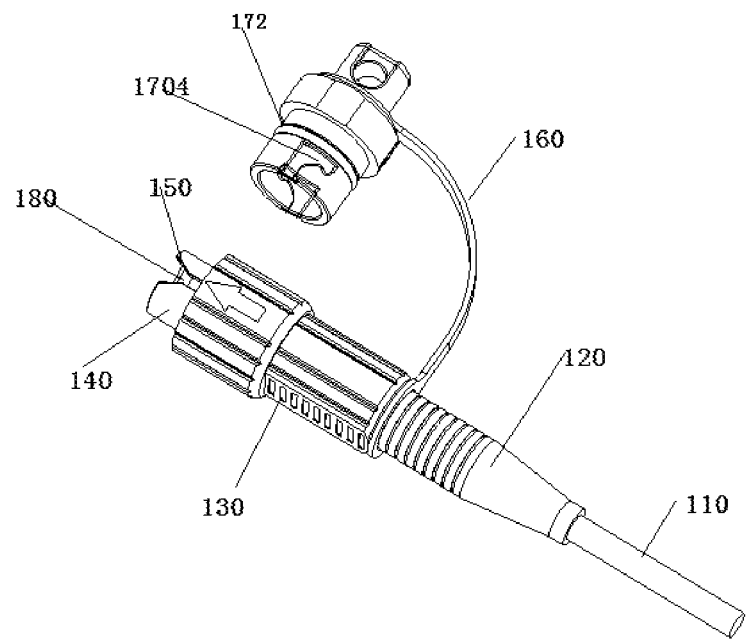
FIG. 3a is a schematic structural diagram of an optical fiber joint according to an embodiment of the present disclosure.

Further, the outer sleeve element 130 is a step-shaped circular tube structure, an inner surface of which has two protruding locking points 1304 (not shown in FIG. 3*a*, reference may be made to 1304 in FIG. 4 and FIG. 5). When connected to the optical fiber adapter 200, the locking points 1304 are fastened to a second sliding slot 2015 (not shown in FIG. 3*a*, reference may be made to 2015 in FIG. 5*a*) on an adapter component 210, thereby implementing locking connection. An external front end of the outer sleeve element 130 has an arrow alignment identifier for indicating connection and disconnection states of the connector; and a rear end of the outer sleeve element 130 has symmetric cut planes, and there are vertical shallow grooves in the planes to enhance operation feeling.

Figure 3B:
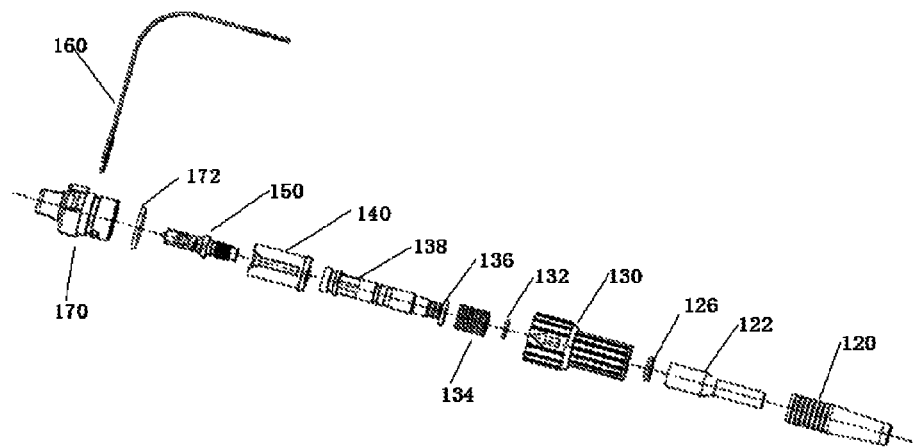
FIG. 3b is an exploded diagram of an optical fiber joint according to an embodiment of the present disclosure.

As shown in FIG. 3*a*-3*b*, the optical fiber joint 100 further includes a tail ferrule 120, an insertion core 150, and a rope 160, and a joint dust-proof cap 170.

Symmetric second sliding slots 1704 are placed on an outer surface of the joint dust-proof cap 170, and the joint dust-proof cap 170 is equipped with an O-shaped sealing ring 172. The joint dust-proof cap 170 is tied to the body of the optical fiber joint 100 by using the rope 160.

Figure 3C:
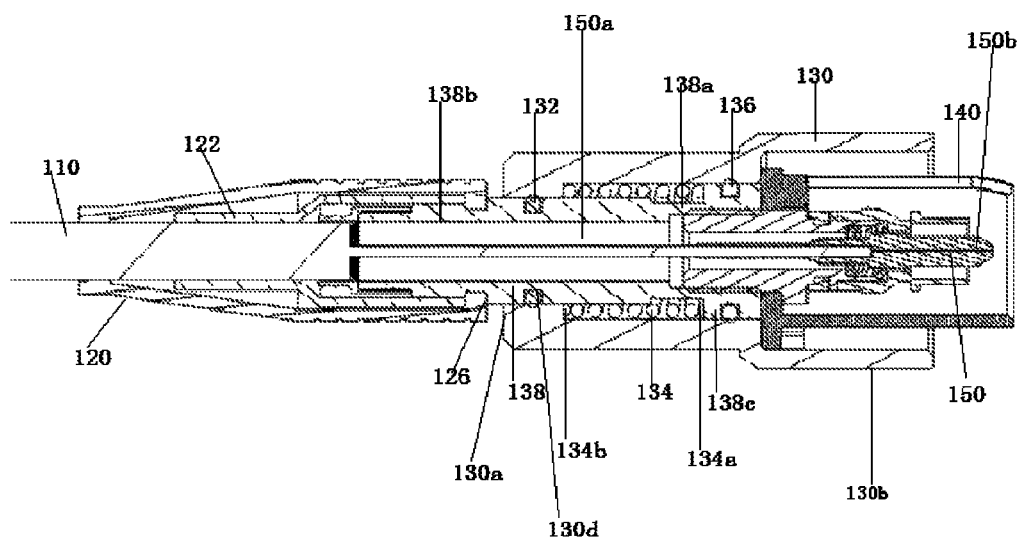
FIG. 3c is a sectional diagram of an optical fiber joint according to an embodiment of the present disclosure.

FIG. 3*b* is an exploded diagram of an optical fiber joint, and FIG. 3*c* is a sectional diagram of the optical fiber joint. As seen from FIG. 3*b* and FIG. 3*c*, from the perspective of an internal structure, referring to FIG. 3*b*, the optical fiber joint 100 includes a ferrule 122, a snap ring 126, an O-shaped sealing ring 132, an O-shaped sealing ring 136, an O-shaped sealing ring 172, an elastic component 134, and a connecting piece 138. Referring to FIG. 3*a* and FIG. 3*b*, in this embodiment of the present disclosure, the insertion core 150, the connecting piece 138, the elastic component 134, and the outer sleeve element 130 are sequentially sleeved onto the optical cable 110.

Referring to FIG. 3*c*, the insertion core 150 is sleeved onto the optical cable 110. In this implementation manner, the insertion core 150 is a circular cylinder having a plurality of steps. The optical cable 110 passes through the insertion core 150. The insertion core 150 includes two oppositely arranged ends 150*a* and 150*b*, and the optical cable 110 is exposed at the end 150*b* that is of the insertion core 150 and far from the connecting piece 138. The connecting piece 138 is sleeved onto the end 150*a* of the insertion core 150. Inner aramid yarn of the optical cable 110 is fastened to the connecting piece 138 by using the snap ring 126. The tail ferrule 120 may be prefabricated and finally sleeved onto the optical cable, or may be cast in an integral injection manner.

The connecting piece 138 includes two oppositely arranged ends 138*a* and 138*b*. The end 138*a* of the connecting piece 138 is thread-connected to the end 150*b* of the insertion core 150. The other end 138*b* of the connecting piece 138 is fixed at outer aramid yarn of the optical cable 110 by using the snap ring 126. The end 138*a* of the connecting piece 138 is sleeved with O-shaped sealing rings 132 and 136 for purpose of sealing. The end 138*a* of the connecting piece 138 includes a shaft shoulder 138*c*. The shaft shoulder 138*c* is configured to abut against the elastic component 134.

The elastic component 134 includes two oppositely arranged ends 134*a* and 134*b*. The end 134*a* of the elastic component 134 abuts against the end 138*a* that is of the connecting piece 138 and close to the insertion core 150. In this implementation manner, the elastic component 134 is a spring, and the elastic component 134 is sleeved onto the connecting piece 138. The end 134*a* of the elastic component 134 abuts against the shaft shoulder 138*c* of the connecting piece 138.

The outer sleeve element 130 includes two oppositely arranged ends 130*a* and 130*b*. The outer sleeve element 130 is sleeved onto the connecting piece 138 and the insertion core 150. The end 130*a* of the outer sleeve element 130 is slidingly connected to the connecting piece 138, and abuts against the end 134*b* of the elastic component 134. The elastic component 134 is configured to provide elasticity against the insertion core 150 for the outer sleeve element 130, thereby preventing a loose connection. Symmetric locking points 1304 (referring to 1304 in FIG. 4*a* and FIG. 4*b*) are placed in an inner wall of the end 130*b* of the outer sleeve element 130, and the locking points 1304 are cylindrical projections.

In this implementation manner, the outer sleeve element 130 is a circular cylinder having steps. The end 130*a* of the outer sleeve element 130 inwardly forms a flange 130*d* configured to abut against the end 134*b* of the elastic component 134. The elastic component 134 is clamped between the flange 130*d* and the shaft shoulder 138*c*. Two opposite locking points 1304 are placed in an inner wall of the end 130*b* of the outer sleeve element 130, and the locking points 1304 are cylindrical projections. Certainly, in other implementation manners, a plurality of locking points 1304 may be arranged along the circumference of the outer sleeve element 130.

An outer surface of the other end 130*b* of the outer sleeve element 130 has an arrow alignment identifier for indicating connection and disconnection states of the optical fiber connector 10. An outer surface of the outer sleeve element 130 has symmetric cut planes, and there are vertical shallow grooves in the planes to enhance operation feeling.

The inner sleeve element 140 extends along an axial direction of the insertion core 150, where the end 150*b* that is of the insertion core 150 and far from the connecting piece 138 is held in the inner sleeve element 140. In this embodiment, one end of the inner sleeve element 140 is fixed at a snap ring, where the snap ring is sleeved onto the end 150*b* of the insertion core 150. The inner sleeve element 140 has a sleeve protruding forward, the sleeve is C-shaped, and protrudes out of a ceramic insertion core end face of the insertion core 150, so as to implement a protection function for the insertion core, prevent contamination to the insertion core end face due to contact with other components during inserting and removing operations of the optical fiber joint, or protect the insertion core from damage due to a drop. From a longitudinal perspective, the sleeve has a horn-shaped opening, where the horn-shaped opening is configured to socket into the locating key 2014 (referring to FIG. 5*a*) on the optical fiber adapter 200 when the optical fiber joint 100 is inserted into the optical fiber adapter 200, so that the optical fiber joint 100 is accurately aligned with the optical fiber adapter 200.

Further, an opening angle of the horn-shaped opening is equal to or larger than 10 degrees, and is smaller than or equal to 30 degrees. The opening angle is an angle formed between a direction along the axial direction of the sleeve and an edge direction of the horn-shaped opening, as shown in FIG. 6, which may be specifically 10 degrees, 15 degrees, 22.5 degrees, or 30 degrees.

The end 130*b* of the outer sleeve element 130 is fixed at and sealed with the optical cable 110 by using the ferrule 122.

The tail ferrule 120 is sleeved onto the ferrule 122, and is fixed by using the snap ring 126, thereby enhancing tensile intensity and sealing performance of the optical fiber joint 100. The tail ferrule 120 may be prefabricated and finally sleeved onto the optical cable, or may be cast in an integral injection manner.

The optical fiber joint 100 includes a joint dust-proof cap 170. Referring to FIG. 3a, the joint dust-proof dust 170 is tied on the optical fiber joint 100 by using the rope 160. A joint holding cavity is placed at one end of the joint dust-proof cap 170, where the joint holding cavity extends axially along the joint dust-proof cap 170, and the joint holding cavity holds the insertion core 150 and the inner sleeve element 140. The joint dust-proof cap 170 has the O-shaped sealing ring 172.

Figure 4A:
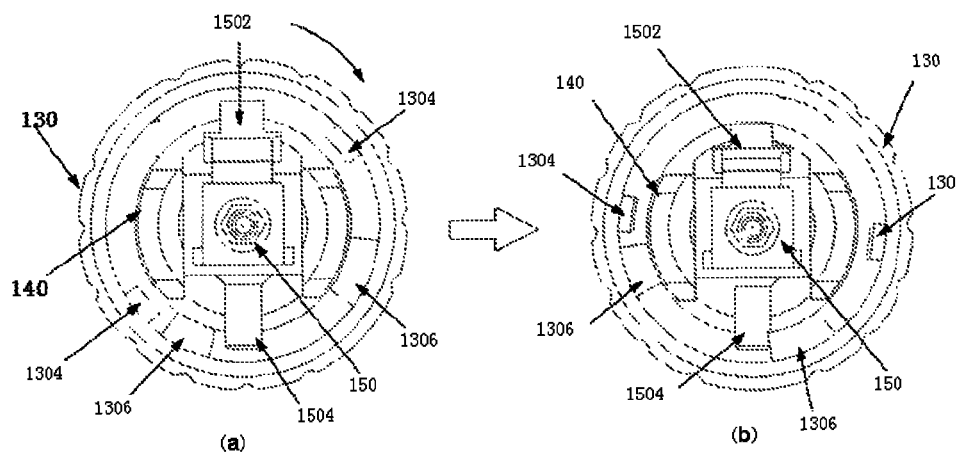
FIG. 4a is a front projection diagram of an outer sleeve element according to an embodiment of the present disclosure.
Figure 4B:
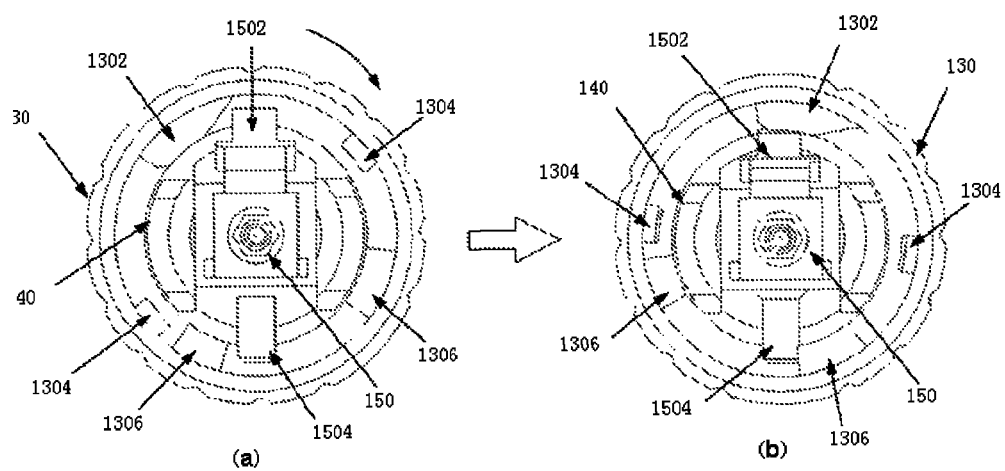
FIG. 4b is a front projection diagram of an outer sleeve element according to another embodiment of the present disclosure.

In FIG. 3a, at least one first sliding slot 1704 is arranged on the periphery of the joint dust-proof cap 170, where the number of sliding slots 1704 is equal to the number of locking points 1304 (referring to FIG. 4a and FIG. 4b for the locking points 1304). The sliding slot 1704 cooperates with the locking point 1304 of the outer sleeve element 130, where the sliding slot 1704 is in a spiral shape, the sliding slot 1704 extends from one end of the joint dust-proof cap 170 to circumference of the joint dust-proof cap 170, and the extended tail end of the sliding slot 1704 is fastened to the locking point 1304. In this implementation manner, the extended tail end of the sliding slot 1704 is in an arc shape matching the shape of the locking point 1304. An outer surface of the joint dust-proof cap 170 has an arrow identifier and identifiers "0" and "1". When the optical fiber joint 100 is inserted into the joint dust-proof cap 170, the arrow identifier on the outer sleeve element 130 aligns with the arrow identifier on the joint dust-proof cap 170. When the joint dust-proof cap 170 is turned towards the direction of "0", the optical fiber joint 100 enters a locking state, and when the joint dust-proof cap 170 is turned towards the direction of "1", the optical fiber joint 100 enters a release state. A double locking manner is used, thereby ensuring long and reliable optical performance of the optical fiber connector.

When the joint dust-proof cap 170 is fastened to the optical fiber joint 100, the insertion core 150 and the inner sleeve element 140 are inserted into the holding cavity. The locking point 1304 of the optical fiber joint 100 slides into the sliding slot 1704 of the joint dust-proof cap 170, and the joint dust-proof cap 170 is turned from the direction of "1" to the direction of "0", so that the locking point 1304 slides to the tail end of the sliding slot 1704, thereby implementing locking. By using the foregoing operations, the joint dust-proof cap 170 is fastened to the optical fiber joint 100.

FIG. 4a and FIG. 4b are front projection diagrams of the optical fiber joint 100, where an internal fastener unlocking structure of the optical fiber joint 100 is illustrated. FIG. 4a illustrates an internal unlocking structure when the insertion core 150 does not have a snap-lock wing. The left part (a) in FIG. 4a illustrates an initial state of the inner fastener of the optical fiber joint 100, and the right part (b) in FIG. 4a illustrates a locked state of the inner fastener of the optical fiber joint 100. FIG. 4b illustrates an internal unlocking structure when the insertion core 150 has a snap-lock wing. The left part (a) in FIG. 4b illustrates an initial state of the inner fastener of the optical fiber joint 100, and the right part (b) in FIG. 4b illustrates a locked state of the inner fastener of the optical fiber joint 100.

As shown in FIG. 4b, an inner surface of the outer sleeve element 130 has a sloped boss 1302. When the optical fiber joint 100 and the optical fiber adapter 200 are in a connection and locking state, the sloped boss 1302 bypasses the snap-lock wing 1502 on the insertion core 150, and in this case, the snap-lock wing 1502 is fastened to a snap on the socket 201 (referring to FIG. 5a), thereby implementing connection and locking.

It should be noted that, in this embodiment, the insertion core 150 that does not have a snap-lock wing may also be adopted, and in this case, the inner surface of the outer sleeve element 130 does not have a corresponding sloped boss.

Further, the two symmetric locking points 1304 on the inner surface of the outer sleeve element 130 are fastened to the two symmetric second sliding slots 2015 on the outer surface of the socket 201 (referring to FIG. 5a), thereby implementing double locking and connection. When the optical fiber joint 100 needs to be removed from the optical fiber adapter 200, the outer sleeve element 130 is turned to change from the state illustrated in the left part (a) in FIG. 4b to the state illustrated in the right part (b) in FIG. 4b. In this case, the snap-lock wing 1502 on the insertion core 150 is pressed down by the sloped boss 1302 of the outer sleeve element 130, thereby implementing fastening unlocking. Meanwhile, the two symmetric locking points 1304 on the inner surface of the outer sleeve element 130 are also turned and released from the two symmetric second sliding slots 2015 on the outer surface of the socket 201, and in this case, the optical fiber joint 100 may be removed from the optical fiber adapter 200.

Further, in this embodiment, the outer sleeve element 130 may be turned by 45 degrees to implement a process of locking and unlocking of the connector. To limit the turning angle of the outer sleeve element 130, a limiting column 1504 is arranged on the insertion core 150, and left and right limiting stages 1306 are designed on the outer sleeve element 130. When the connector is in the connected and locking state as illustrated in the left part (a) in FIG. 4b, the limiting column 1504 is limited by the left limiting stage 1306 and cannot be turned further; and when the connector is in the released state as illustrated in the right part (b) in FIG. 4b, the limiting column 1504 is limited by the right limiting stage 1306 and cannot be turned further.

Figure 5B:
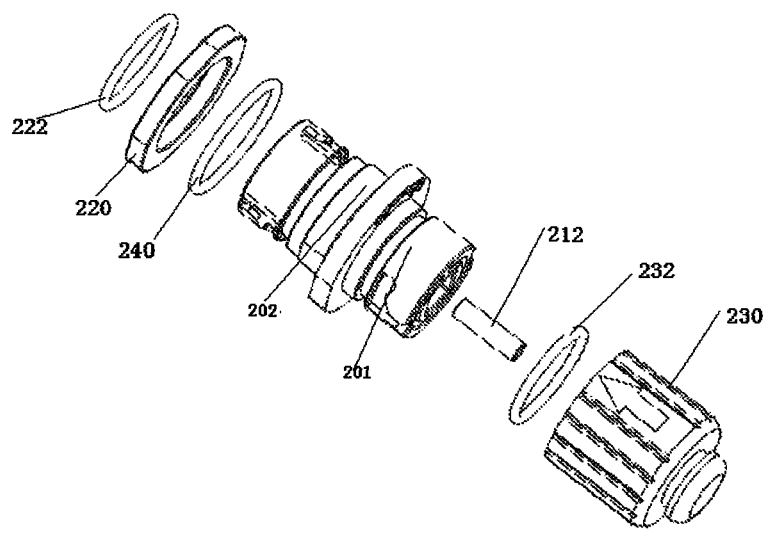
FIG. 5b is an exploded diagram of an optical fiber adapter according to an embodiment of the present disclosure.

FIG. 5a is a schematic structural diagram of the optical fiber adapter 200. FIG. 5b is an exploded diagram of the optical fiber adapter 200. As shown in FIG. 5a and FIG. 5b, the socket 201 is placed at one end of the optical fiber adapter 200.

Further, a socket 202 may be further placed at the other end of the optical fiber adapter 200. The two sockets 201 and 202, and the ceramic ferrule 212 that is arranged at the center of the adapter may be welded together using ultrasound.

The socket 201 has the cavity 2011 and the slot 2012, where the cavity 2011 is located at the middle part of the socket 201, and the cavity 2011 and the slot 2012 axially extends along the socket 201. The slot 2012 surrounds the periphery of the cavity 2011. The cavity 2011 cooperates with the insertion core 150, the slot 2012 cooperates with the inner sleeve element 140, and a locating key 2014 is placed in the slot 2012. The locating key 2014 is a strip-like projection extending axially along the socket 201, so that the slot 2012 forms a C-shaped section and seamlessly connects to the sleeve that has a C-shaped opening in the optical fiber joint. In this way, blind insertion of the optical fiber joint may be implemented, and the operation is simpler, thereby implementing plug and play of the optical fiber connector.

From the perspective reverse to the axial direction of the socket 201, the C-shaped slot 2012 is a circle or an ellipse with an opening. When the optical fiber joint 100 is inserted into the optical fiber adapter 200, the C-shaped inner sleeve element cooperates with the locating key 2014, and is inserted into the slot 2012. In this embodiment, the sockets 201 and 202 are cylindrical. The cavity 210 is a square cavity or a circular cavity. The slot 2012 is a C-shaped slot.

The slot 2012 that has a C-shaped section is configured to hold a C-shaped tail end of the sleeve 180 of the optical fiber joint 100 that matches the optical fiber adapter 200. The locating key 2014 is configured to connect to the opening of the sleeve of the optical fiber joint 100 that matches the optical fiber adapter 200. The width of the locating key 2014 is equivalent to the width of the opening of the sleeve 180 of the optical fiber joint 100.

As shown in FIG. 5a, the second sliding slot 2015 is placed on the periphery of the socket 201, where the second sliding slot 2015 is in a spiral shape, and the second sliding slot 2015 circumferentially extends along the socket from one end of the socket 201, and the tail end to which the second sliding slot 2015 extends is fastened to the locking point 1304. In this embodiment, the second sliding slot 2015 is in the same shape as the sliding slot 1704 (referring to FIG. 3a) of the joint dust-proof cap 170.

As shown in FIG. 5b, the optical fiber adapter 200 includes an O-shaped sealing ring 222, a locking nut 220, an O-shaped sealing ring 240, a socket body 210, and a ceramic ferrule 212. The O-shaped sealing ring 240, the locking nut 220, and the O-shaped sealing ring 240 are sequentially sleeved onto the socket body 210, and the ceramic ferrule 212 is inserted into the other end of the socket body 210, and is fixed by using the O-shaped sealing ring 222.

The optical fiber adapter 200 includes an adapter dust-proof cap 230, where one end of the adapter dust-proof cap 230 has an adapter holding cavity for holding the optical fiber adapter 200. The holding cavity is configured to hold the socket 201 when the optical fiber adapter 200 is inserted into the dust-proof cap 230.

When the optical fiber joint 100 is inserted into the optical fiber adapter 200, the horn-shaped opening of the sleeve of the inner sleeve element 140 is targeted at and inserted into the locating key 2014 in the sliding slot, the inner sleeve element 140 is inserted into the sliding slot 2012 so that the insertion core 150 is inserted into the cavity 2011, the locking point 1304 of the optical fiber joint slides into the second sliding slot 2015 of the optical fiber adapter, and the optical fiber socket 201 is turned so that the locking point 1304 slides to the tail end of the second sliding slot 2015, thereby implementing locking.

Based on the foregoing technical solutions, the optical fiber connector provided by this embodiment of the present disclosure is seamlessly connected to the C-shaped slot of the optical fiber adapter by using the sleeve having the C-shaped opening of the optical fiber joint. In this way, blind insertion of the optical fiber joint may be implemented, and the operation is simpler, thereby implementing plug and play of the optical fiber connector. The optical fiber connector provided by the embodiment of the present disclosure further achieves the highest water-proof grade.

The foregoing descriptions are merely exemplary specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical fiber adapter, comprising:
   a socket is placed at one end of the optical fiber adapter, wherein a cavity configured to hold an optical fiber and a slot are placed in the socket;
   wherein the cavity is located in a middle part of the socket; and
   the slot surrounds on a periphery of the cavity, and a locating key is placed in the socket, so that the slot forms a C-shaped section;
   wherein the slot having the C-shaped section is configured to hold a C-shaped tail end of a sleeve of an optical fiber joint that matches the optical fiber adapter.

2. The optical fiber adapter according to claim 1, wherein the locating key is configured to connect to an opening of a sleeve of an optical fiber joint that matches the optical fiber adapter.

3. The optical fiber adapter according to claim 1, wherein a width of the locating key is equivalent to a width of an opening of the optical fiber joint.

4. An optical fiber connector, comprising an optical fiber joint and an optical fiber adapter, wherein
   the optical fiber joint comprises: an optical cable; an inner sleeve element with a cavity inside, wherein an optical fiber extending out of the optical cable is held in the cavity, one end of the inner sleeve element is fixed at the optical cable, and a sleeve is placed at another end; and an outer sleeve element, wherein the outer sleeve element is sleeved onto an outer side of the inner sleeve element, and the outer sleeve element is capable of axially rotating around the sleeve; wherein the sleeve of the inner sleeve element at least partially protrudes out of the outer sleeve element, and a tail end of the sleeve protruding out of the outer sleeve element has an opening, so that the tail end of the sleeve forms a C-shaped section, and the sleeve having a C-shaped opening is connected to a C-shaped slot of the optical fiber adapter; and
   a socket is placed at one end of the optical fiber adapter, wherein another cavity configured to receive an optical fiber and a slot are placed in the socket, wherein the cavity is located in a middle part of the socket, the slot surrounds on a periphery of the cavity, and a locating key is placed in the socket, so that the slot forms another C-shaped section.

5. The optical fiber connector according to claim 4, wherein an inner wall of the outer sleeve element of the optical fiber joint has at least one projection.

6. The optical fiber connector according to claim 4, wherein at least one sliding slot is placed on an outer surface of the socket of the optical fiber adapter.

7. The optical fiber connector according to claim 5, wherein the optical fiber joint is inserted into the optical fiber adapter, and the at least one projection is connected to at least one sliding slot.

8. The optical fiber adapter according to claim 2, wherein a width of the locating key is equivalent to a width of the opening of the optical fiber joint.

9. The optical fiber connector according to claim 6, wherein the optical fiber joint is inserted into the optical fiber adapter, and a projection is connected to the sliding slot.

* * * * *